United States Patent [19]
Fressola et al.

[11] Patent Number: 4,890,415
[45] Date of Patent: Jan. 2, 1990

[54] TIMING DEVICE FOR LIVE ANIMAL TRAPS

[76] Inventors: Alfred A. Fressola, 40 Todds Way, Easton, Conn. 06612; Ronald E. Barry, Jr., 240 Armstrong Ave., Frostburg, Md. 21532

[21] Appl. No.: 286,387

[22] Filed: Dec. 19, 1988

[51] Int. Cl.$^4$ ............................................. A01M 23/00
[52] U.S. Cl. ............................................. 43/61; 43/58
[58] Field of Search ............................... 43/58, 60, 61

[56] References Cited

U.S. PATENT DOCUMENTS 3,508,358  4/1970  Lee ........................................... 43/60

OTHER PUBLICATIONS

Fox, B. J., A Method for Determining Capture Time of Small Mammals, 1978, Journal of Wildlife Management, 42:672–676.
Jenness, C. A. and G. D. Ward, A Versatile Timer for Field Studies in Animal Ecology, 1985, Journal of Wildlife Management, 49:1025–1028.
Withers, P. C. and K. Achleitner, A Simple, Low-Cost Timing Device for Mammal Traps, 1980, Journal of Mammalogy, 61:153–155.
Drickamer, L. C., Influence of Time of Day on Captures of Two Species of Peromyscus in a New England Deciduous Forest, 1987, Journal of Mammalogy, 68:702–703.
Drickamer, L. D. and M. R. Capone, Weather Parameters, Trappability and Wicke Separation in Two Sympatric Species of Peromyscus, 1977, American Midland Naturalist, 98:376–381.

Primary Examiner—Nicholas P. Godici
Assistant Examiner—Carmine Cuda
Attorney, Agent, or Firm—Mattern, Ware, Stoltz & Fressola

[57] ABSTRACT

A timing device for use with live animal traps accurately and easily maintains the elapsed time since an entering animal caused the trap door to close. The timing device uses a switch that senses trap door closure to activate a timing module. All components of the timing device mount unobtrusively to the trap so as not to hinder its operation and, for collapsible traps, to allow folding of the traps for storage and transport.

17 Claims, 1 Drawing Sheet

U.S. Patent     Jan. 2, 1990     4,890,415
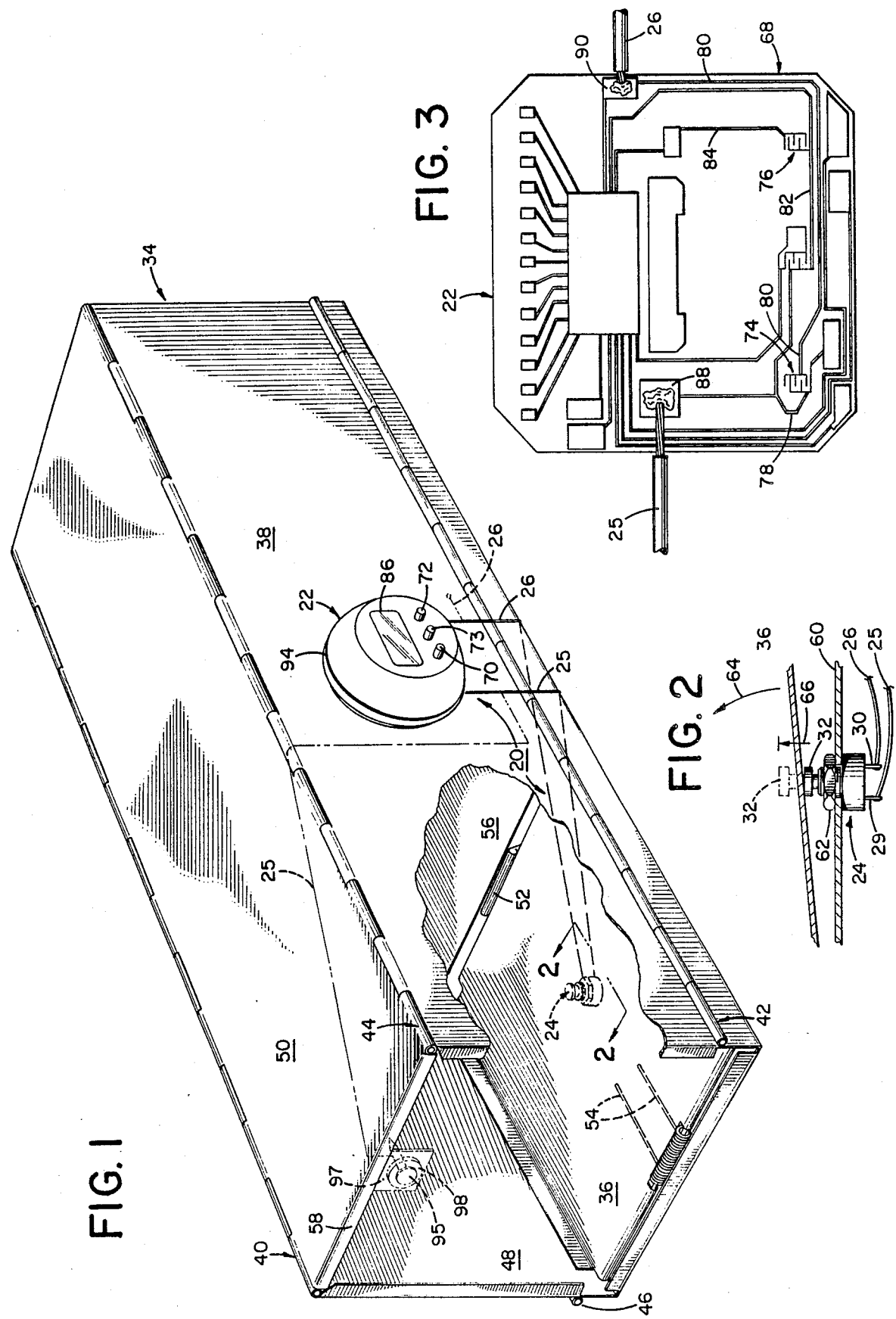

4,890,415

TIMING DEVICE FOR LIVE ANIMAL TRAPS

TECHNICAL FIELD

The present invention relates to a timing device for use with live animal traps, and particularly such traps for capturing small mammals and the like.

BACKGROUND OF THE INVENTION

The timing device of the present invention is for use with live animal traps so as to determine the time of animal capture. Inventor Ronald E. Barry Jr.'s interest in niche overlap among syntopic small mammals stimulated the need to examine temporal, circadian relationships among such potential competitors. Drickamer and Capone* (1977) and Drickamer (1987) have suggested, for instance, that *Peromyscus leucopus* and *P. maniculatus* in Massachusetts, U.S.A. partition time and thus reduce the potential for competition where they coexist.

* Citations of literature cited are presented in Table 1 below. Copies of the literature are made part of the patent prosecution file history.

Recording the time of capture of small mammals in live traps should provide meaningful information on circadian rhythms (i.e., activity peaks). The use of traps to generate such information has several advantages over other techniques, such as radio telemetry, since trapping is less expensive and labor intensive per individual of the population monitored. Although telemetry provides more information for any individual studied, more individuals can be observed simultaneously in a trapping study.

Several prior art timers have been designed for use in determining small mammal activity in trapping studies. However, assembly, accuracy, and size of these prior art timers, and difficulty or length of time required to read these prior art timers, are problems overcome by the present invention. It should be noted that these factors are of great importance to mammalogists who may use 100 or more live animal traps at one time. These prior art references are also presented in Table 1 below.

TABLE 1

Fox, B. J. 1978. A method for determining capture time of small mammals. Journal of Wildlife Management, 42:672-676.

Jenness, C. A., and G. D. Ward. 1985. A versatile timer for field studies in animal ecology. Journal of Wildlife Management, 49:1025-1028.

Withers, P. C. and K. Achleitner. 1980. A simple, low-cost timing device for mammal traps. Journal of Mammalogy, 61:153-155.

Drickamer, L. C. 1987. Influence of time of day on captures of two species of *Peromyscus* in a New England deciduous forest. Journal of Mammalogy, 68:702-703.

Drickamer, L. D., and M. R. Capone, 1977. Weather parameters, trappability and niche separation in two sympatric species of *Peromyscus*. American Midland Naturalist, 98:376-381.

Thus, Fox (1978) described a timing device designed for use with a collapsible, aluminum small mammal trap. This device had an accuracy of only approximately 98% (28 minute error over a 24-hour period) and required a considerable length of time (up to five minutes) in the field to estimate the time of animal capture. A timer is disclosed which uses the time constant associated with a resistor-capacitor combination, which is later measured by the user with a second device. The present invention is accurate to within one minute in a 24-hour period and does not require any other device for field determination of elapsed time since the trap has been closed.

Withers and Achleitner (1980) devised a timer for aluminum live traps manufactured by H. B. Sherman Traps, Inc. of Tallahassee, Fla. This timer had the same problems as cited above for Fox since it also uses a resistor—capacitor circuit to perform the timing function. The voltage of the capacitor must be read by a separate voltmeter to estimate elapsed time since the trap was entered.

Jenness and Ward (1985) developed a timer for use with cage traps. The disclosed circuit uses an oscillator whose frequency is dependent upon a resistor—capacitor combination, with the output of the oscillator presented to a counter. The output of the counter is a plurality of light emitting diodes (LED's), each representing an increase in count values (and thus time) by a factor of two. The accuracy of the overall timer is stated as being dependent entirely upon the accuracy of the oscillator, which in turn is subject to variation due to temperature changes. One disadvantage of this unit is its bulkiness (it is mounted in a 90 milliliter container and requires three AA type batteries for operation). This timer is also subject to considerable loss of accuracy unless it is calibrated with a digital frequency counter. Such calibration is a further time-consuming process.

In addition, all of the aforementioned prior art timers require considerable effort to fabricate their respective circuit components.

The present invention is small, does not require calibration, is highly accurate (less than one minute error in a 24-hour period), and is not subject to temperature related variations of more than one minute per 24 hours throughout an ambient temperature range of at least $-3$ degrees Celsius to 45 degrees Celsius.

All of the limitations and problems associated with the prior art timers have been overcome in the present invention. The present timing device is for use with Sherman-type live traps and is inexpensive, compact, easy to assemble, accurate, and easy to read in the field. The timing device is fabricated from commercially available components, has a timing cycle of up to one year, and a digital liquid crystal display (LCD). The timing device is also suitable for use on such live traps which can be collapsed (folded) during non-use.

SUMMARY OF THE INVENTION

The present invention is a timing device for use with live traps so as to easily and accurately determine the time of capture of small mammals. Such time of capture is particularly important to mammalogists so as to determine meaningful information on circadian rhythms, such as activity peaks of such mammals.

The timing device comprises a switch which is positioned on the live trap so as to change state (such as from an electrically open state to an electrically closed state) when the trap door on the trap is closed by an intruding mammal. The timing device also comprises a digital timing (clock) module and wires which are electrically connected to the module so as to start the clock's normal clock function when the switch changes state. By recording the starting time of the clock when the trap is placed in the wild (this starting time not advancing until the trap door is closed) and the time on the timing module at the time the trap is retrieved, the elapsed time since capture can be determined by subtraction. The actual time of capture is therefore the actual time of retrieval minus the determined elapsed time. These simple calculations can be determined after retrieval if the three pertinent times (starting time on the clock module, time showing on clock module at time of retrieval and actual time of retrieval) are recorded by the mammalogist or his or her assistant.

By providing a simple and accurate means of determining animal capture, the mammalogist can easily obtain capture time information for many animals during a given trapping session; and therefore a new unit of information is readily available to the mammalogist to use in conjunction with her or his mammal studies.

OBJECTS OF THE INVENTION

It is therefore a principal object of the present invention to provide a timing device for use in conjunction with the live capture of animals which is easy to use and which is inexpensive and accurate.

Another object of the present invention is a timing device which can be installed on a foldable live trap and not prevent the trap from being folded.

A still further object of the present invention is a timing device which is easy to fabricate and which comprises few components.

Other objects of the present invention will in part be obvious and will in part appear hereinafter.

BRIEF DESCRIPTION OF THE DRAWINGS

For a fuller understanding of the nature and objects of the present invention reference should be made to the following detailed description taken in conjunction with the following drawings, in which:

FIG. 1 is perspective view of a live trap for the capture of small mammals and the timing device of the present invention, including the switch, wire, and timing module. An alternative switching device is illustrated in phantom.

FIG. 2 is a side elevational view taken along line 2—2 of FIG. 1 illustrating movement of the switch plunger when the trap door is closed.

FIG. 3 is an enlarged internal view of the printed circuit board forming the electronic portion of the timing module, illustrating terminating placement areas for the connecting wires.

BEST MODE FOR CARRYING OUT THE INVENTION

As best seen in FIG. 1, a timing device 20 according to the present invention comprises a digital timing (clock) module 22, a switch 24 and wire 25 and 26 connecting switch 24 to module 22. The timing module is a digital module such as the Micronta ® stick-on liquid crystal display calendar clock (catalog# 63-840) sold by the Radio Shack Division of Tandy Corporation of Fort Worth, Tex. 76102. Other digital clock modules having a "display" and a "set" function should also work properly if operated and connected to the switch as described below.

The switch can be any type of push button switch of the normally closed type; that is, a switch having terminals 29 and 30 that are normally closed (connected) to each other when the switch plunger 32 is in its normally extended position (see FIG. 2). The particular switch used is a mini single pole-single throw, normally closed, push on-off switch sold under catalog # 275-1548 of the Radio Shack Division of the Tandy Corporation.

As seen in FIG. 1, the timing module 22 is mounted to the right hand side of a small-mammal live trap 34 with respect to trap door 36. Typical of such live traps are the traps manufactured by H. B. Sherman Traps, Inc. of Tallahassee, Fla. 32316. These traps come in various sizes and can be obtained in foldable (collapsible) varieties (as shown in FIG. 1) or nonfoldable varieties. The folding varieties are fabricated so that sidewall 38 is exposed when the trap is folded by movement of hinge 40 toward hinge 42 and then movement of hinge 44 toward hinge 46 so as to hide sidewall 48 and 50. Therefore timing module 22 does not interfere with such folding.

Trap door 36 is held in an open position as shown in FIG. 1 by means of clip 52. The door is spring loaded by spring 54 while clip 52 is triggered by animal weight on trigger pad 56, thereby releasing door 36 toward trap perimeter 58.

As seen in FIGS. 1 and 2, switch 24 is mounted through a hole in bottom wall 60 by means of nut 62. Plunger 32 is depressed when trap door 36 is held beneath clip 52 as shown in FIGS. 1 and 2. The hole for the above-mentioned switch is approximately ¼ inch (6.4 millimeters) in diameter and positioned centrally with respect to trap door 36 when the door is in its open position. When trap door 36 is released as shown diagrammatically by arrow 64 in FIG. 2, plunger 32 moves upward as shown in phantom and as shown diagrammatically by arrow 66. This plunger movement closes switch terminals 29 and 30.

Wires 25 and 26 are preferably soldered to terminals 29 and 30 and extend along the outer perimeter of bottom trap wall 60 and sidewall 38 as shown in FIG. 1. FIG. 3 is an enlarged view of printed circuit board 68 of timing module 22. The "display" pushbutton 70 and the "set" pushbutton 72 of module 22 are respectively associated with switch areas 74 and 76 so as to connect printed circuit board trace 78 to trace 80 or to connect trace 82 to trace 84 when the corresponding pushbutton is depressed.

These clock modules typically have a similar technique for setting the time. This technique involves depressing the "set" pushbutton 72 until the desired time interval is blinking on display 86, and then depressing the "display" pushbutton until the desired value of this time interval is displayed. The typical sequence of timing interval as the "set" pushbutton is depressed is month, date, hour, minute and second. Thus, for instance, the first time the "set" pushbutton is depressed, the month can be changed by depressing the "display" pushbutton. It has been experimentally found that if at least one timing interval is altered as one sequences through the timing intervals, the timing module will not begin to keep time until the "display" pushbutton is depressed while the timing interval shows hours and minutes on display 86. This observation effectively means that connection of trace 78 to trace 80 is required to start the timing function.

It has also been experimentally found that continuous connection of trace 78 to trace 80 does not adversely affect the timing operation of the module even though under normal user action, traces 78 and 80 would only be connected momentarily when "display" pushbutton 70 is depressed.

As a result of these observed characteristics of the digital timing modules, connection of wires 25 and 26 to printed circuit electrical pads 88 and 90 connects traces 78 and 80 when switch terminals 29 and 30 are closed. This condition occurs when trap door 36 is sprung closed by an entering animal, which therefore activates timing action by timing module 22.

When the trap is retrieved, the time shown on display 86 is noted and by subtracting the time indicated when the trap was set, the elapsed time from animal entry is calculated. By subtracting this elapsed time from the actual time of trap retrieval, the actual time of animal entry is determined. For instance, the timing device may be set to show 1:00 P.M. when the trap is set. The trap is retrieved at 6:43 A.M. (actual time) and shows 5:42 P.M. on its display. Thus the elapsed time since animal entry into trap 34 is 5:42 P.M. minus 1:00 P.M., or 4 hours and 42 minutes. Subtracting this elapsed time from the actual time of trap retrieval yields 2:01 A.M. as the actual time of animal entry into trap 34.

These three "times" are typically recorded by the mammalogist in the field with the above mentioned calculations made at a later time. Typically it takes less than 30 seconds to determine time of animal capture using the present timing device. It has been experimentally found that the presence of the timing device does not alter the handling of the animal within the trap.

Timing module 22 is preferably sealed with silicone along seam 94, the edge of display 86 and about the "display", "set" and "timer" pushbuttons 70, 72, and 73 respectively so as to prevent moisture from affecting its operation, and especially the readability of display 86.

One hundred timing devices according to the present invention were field tested in a study of activity peaks of Peromyscus in a western Maryland woodlot. These tests were conducted in the spring of 1988 in heavy rains. No significant moisture related problems were noted after use of the abovementioned silicone.

These and other field studies of the present invention disclosed little damage to the timing device, including wires 25 and 26. The various animals captured during these studies include *Peromyscus, Clethrionomys gapperi, Blarina brevicauda, Sorex cinereus, S. f-umeus, Tamiasciurus hudsonicus, Tamias striatus, Glaucomys volans, Didelphis virginiana* (juvenile), and *Mustela frenata*. It was also discovered that even if wires 25 or 26 are chewed and broken by an animal, such action usually occurs subsequent to the trap being disturbed and the trap door closing. Such action activates the timing device, and the elapsed time from this disturbance can be easily determined. The animal causing the trap disturbance can often be determined from animal signs in the area. Any damage to wires 25 or 26 is quickly and inexpensively repaired.

Although a normally closed switch is described above, it is readily apparent that a normally open type switch could also be used if it was placed into a closed configuration when the trap door is closed. This result could be achieved by mounting the switch in the vicinity of trap perimeter 58 (see FIG. 1).

In fact, the trap itself can be used as one path to either electrical pad 88 or 90, with the other electrical path conveyed by the trap door contacting a nail 95, which is otherwise insulated from the trap by mounting bracket 97 and insulator 98 (see phantom components shown in FIG. 1).

It should also be noted that switch 24 can be used for activating other electrical components when an animal enters the trap, such as a low wattage electrical heater and the like, so as to decrease the probability of animal mortality when in the trap during cold or other types of inclement weather.

Thus what has been described is a new, inexpensive, accurate and reliable device for determining the actual time of animal capture in live traps.

From the foregoing description, it is submitted that the objects set forth above and those made apparent from the description are efficiently attained and, since changes may be made in the timing device without departing from the scope of the invention, it is intended that all matter contained in the above description or shown in the accompanying drawings shall be interpreted as illustrative, and not in a limiting sense.

It is submitted that the following claims are intended to cover all the generic and specific features of the timing device herein described and all statements of the scope of the invention, which as a matter of language, might be said to fall therebetween.

Having described the invention, what is claimed is:

1. A timing device for use with a live animal trap having a trap door so as to determine the elapsed time since animal entry into the trap causing closure of the trap door, comprising:
   A. a switch with a pair of terminals which are electrically opened or closed with respect to each other, the switch mountable to the trap so as to close its electrical terminals when the trap door is closed;
   B. a timing module, mountable to the trap, for performing a timing function when activated, the timing module having a numeric timing display and means for allowing the numeric timing display to be maintained in a constant state, the timing module having a pair of electrical contact areas which when electrically connected to each other will activate the timing function of the timing module; and
   C. wires for electrically connecting the terminals of the switch to the pair of electrical contact areas of the timing module;
   whereby animal entry into the live trap causes the sprung trap door to close the electrical terminals of the switch and thereby activate the timing module timing function and its associated numeric timing display.

2. A timing device as defined in claim 1, wherein the switch is a single-pole single-throw pushbutton switch.

3. A timing device as defined in claim 2, wherein the switch is mounted through a hole in the live trap so as to be depressed when the trap door is open and wherein the switch has normally closed electrically terminals.

4. A timing device as defined in claim 3, wherein the timing module is digital clock module having a set pair of contacts and a display pair of contacts, and wherein the means for allowing the display to be maintained in a constant state comprises the set and display pair of contacts, and wherein the timing module pair of electrical contact areas are electrically connected to the display pair of contacts.

5. A timing device as defined in claim 4, further comprising a sealant applied to the timing module so as to prevent moisture from entering the module.

6. A timing device as defined in claim 1, wherein the timing module is a timing clock module having a set pair of contacts and a display pair of contacts, and wherein the means for allowing the display to be maintained in a constant state comprises the set and display pair of contacts, and wherein the timing module pair of electrical contact areas are electrically connected to the display pair of contacts.

7. A timing device as defined in claim 1, further comprising a sealant applied to the timing module so as to prevent moisture from entering the module.

8. A timing device as defined in claim 1, wherein the live trap has four sides and collapsible end doors (including the trap door), wherein the sides collapse for storage of the trap, wherein the timing module is mounted to one of the trap sides which is exposed when the trap is collapsed so that the timing module does not hinder the collapsibility of the live trap.

9. A timing device for use with a live animal trap having a trap door so as to determine the elapsed time since animal entry into the trap causing closure of the trap door, comprising:
(A) means, mountable to the trap, for switching the electrical conductivity state of said means when the trap door closes, said means comprising a metallic object insulatively mounted to the perimeter of the trap so as to electrically contact the trap door when the trap door closes;
(B) a timing module, mountable to the trap, for performing a timing function when activated, the timing module having a timing display and means for allowing the display to be maintained in a constant state, the timing module having a pair of electrical contact areas which when electrically connected to each other will activate the timing function of the timing module; and
(C) means for electrically connecting the electrical conductivity switching means to the pair of electrical contact areas of the timing module;
whereby animal entry into the live trap causes the spring trap door to switch the electrical conductivity switching means and thereby activate the timing module timing function.

10. A timing device as defined in claim 9, wherein the timing module is a digital clock module having a set pair of contacts and a display pair of contacts, and wherein the means for allowing the display to be maintained in a constant state comprises the set and display pair of contacts, and wherein the timing module pair of electrical contact areas are electrically connected to the display pair of contacts.

11. A timing device as defined in claim 10, further comprising a sealant applied to the timing module so as to prevent moisture from entering the module.

12. A timing device for use with a live animal trap having a trap door so as to determine the elapsed time since animal entry into the trap causing closure of the trap door, comprising:
(A) means, mountable to the trap, for switching the electrical conductivity state of the said means when the trap door closes;
(B) a timing module, mountable to the trap, for performing a timing function when activated, the timing module having a numeric timing display and means for allowing the numeric timing display to be maintained in a constant state, the timing module having a pair of electrical contact areas which when electrically connected to each other will activate the timing function of the timing module; and
(C) means for electrically connecting the electrical conductivity switching means to the pair of electrical contact areas of the timing module;
whereby animal entry into the live trap causes the sprung trap door to switch the electrical conductivity switching means and thereby activate the timing module timing function and its associated numeric timing display.

13. A timing device as defined in claim 12, wherein the electrical connecting means comprise wires.

14. A timing device as defined in claim 12, wherein the timing module is a digital clock module having a set pair of contacts and a display pair of contacts, and wherein the means for allowing the display to be maintained in a constant state comprises the set and display pair of contacts, and wherein the timing module pair of electrical contact areas are electrically connected to the display pair of contacts.

15. A timing device as defined in claim 12, further comprising a sealant applied to the timing module so as to prevent moisture from entering the module.

16. A timing device as defined in claim 12, wherein the live trap has four sides and collapsible end doors (including the trap door), wherein the sides collapse for storage of the trap, wherein the timing module is mounted to one of the trap sides which is exposed when the trap is collapsed so that the timing module does not hinder the collapsibility of the live trap.

17. A timing device for use with a live animal trap having a trap door so as to determine the elapsed time since animal entry into the trap causing closure of the trap door, comprising:
(A) a switch mounted through a hole in the live trap so as to be depressed when the trap door is open and wherein the switch has normally closed electrical terminals which close when the trap is closed;
(B) a timing module, mountable to the trap, for performing a timing function when activated, the timing module having a numeric timing display and means for allowing the display to be maintained in a constant state, the timing module having a pair of electrical contact areas which when electrically connected to each other will activate the timing function of the timing module; and
(C) wires for electrically connecting the terminals of the switch to the pair of electrical contact areas of the timing module;
whereby animal entry into the live trap causes the spring trap door to close the electrical terminals of the switch and thereby activate the timing module timing function.

* * * * *